(12) United States Patent
Steiner et al.

(10) Patent No.: US 9,609,130 B2
(45) Date of Patent: Mar. 28, 2017

(54) SYSTEM AND METHOD FOR MANAGING AGENT SCHEDULES IN A CONTACT CENTER

(71) Applicant: Avaya Inc., Basking Ridge, NJ (US)

(72) Inventors: Robert C. Steiner, Broomfield, CO (US); Katherine A. Sobus, Wilmington, DE (US)

(73) Assignee: Avaya Inc., Basking Ridge, NJ (US)

( * ) Notice: Subject to any disclaimer, the term of this patent is extended or adjusted under 35 U.S.C. 154(b) by 648 days.

(21) Appl. No.: 14/023,270

(22) Filed: Sep. 10, 2013

(65) Prior Publication Data
US 2015/0074170 A1    Mar. 12, 2015

(51) Int. Cl.
*H04M 3/00* (2006.01)
*H04M 5/00* (2006.01)
*H04M 3/523* (2006.01)
*G06Q 10/06* (2012.01)

(52) U.S. Cl.
CPC .......... *H04M 3/5232* (2013.01); *G06Q 10/06* (2013.01); *H04M 2201/14* (2013.01); *H04M 2203/402* (2013.01)

(58) Field of Classification Search
CPC ... H04M 3/5233; H04M 3/5232; H04M 3/523
USPC ........... 379/265.04, 265.05, 265.01, 265.02, 379/265.11, 265.12, 266.01, 266.03
See application file for complete search history.

(56) References Cited

U.S. PATENT DOCUMENTS

| | | | |
|---|---|---|---|
| 6,356,632 B1 * | 3/2002 | Foster | H04M 3/5233 379/265.04 |
| 8,306,212 B2 | 11/2012 | Arora | |
| 8,369,509 B2 | 2/2013 | Jennings | |
| 2011/0150206 A1 * | 6/2011 | Pickford | H04M 3/5175 379/265.09 |
| 2014/0200941 A1 * | 7/2014 | McDaniel | G06Q 10/063116 705/7.16 |

* cited by examiner

*Primary Examiner* — Thjuan K Addy
(74) *Attorney, Agent, or Firm* — Sheridan Ross P.C.

(57) ABSTRACT

A transaction is received in a contact center. The transaction can be an email, an incoming call, an outgoing call, a video call, a text message, and/or the like. A best agent is determined to handle the transaction. A time is determined for the best agent to handle the transaction. The time can be based on a projected time that the agent will be able to handle the transaction, based on a callback time or any criteria. A schedule of the best agent is searched. The schedule of the best agent contains a movable event. A movable event can be any event that can be rescheduled, such as a break. When it is determined that the time for the best agent to handle the transaction is during and/or close to the movable event, the movable event is rescheduled to allow the best agent to handle the transaction.

20 Claims, 5 Drawing Sheets

SYSTEM AND METHOD FOR MANAGING AGENT SCHEDULES IN A CONTACT CENTER

TECHNICAL FIELD

The systems and methods disclosed herein relate to contact centers and in particular to managing agent schedules in a contact center.

BACKGROUND

Adhering to agent schedules can be a challenge for a contact center. In many instances, an agent's schedule for a standard work day may include several events, such as scheduled breaks, lunch breaks, training sessions, defined callback times, and/or the like. Currently, contact centers treat all of these types of events as being fixed and immovable. This causes problems where a specific agent is needed to handle a transaction from a customer (e.g., an incoming call or callback) at a time during a fixed event in the agent's schedule. Existing contact centers either have to reschedule the transaction or select another agent to handle the transaction. In either case, this is not always the optimal solution. What is needed is a better way to manage events in an agent's schedule to meet the needs of the contact center.

SUMMARY

Systems and methods are provided to solve these and other problems and disadvantages of the prior art. A transaction is received in a contact center. The transaction can be an email, an incoming call, an outgoing call, a video call, a text message, and/or the like. A best agent is determined to handle the transaction. A time is determined for the best agent to handle the transaction. The time can be based on a projected time that the agent will be able to handle the transaction, based on a callback time or any criteria. A schedule of the best agent is searched. The schedule of the best agent contains a movable event. A movable event can be any event that can be rescheduled, such as a break. When it is determined that the time for the best agent to handle the transaction is during and/or close to the movable event, the movable event is rescheduled to allow the best agent to handle the transaction.

DETAILED DESCRIPTION

Figure 1:
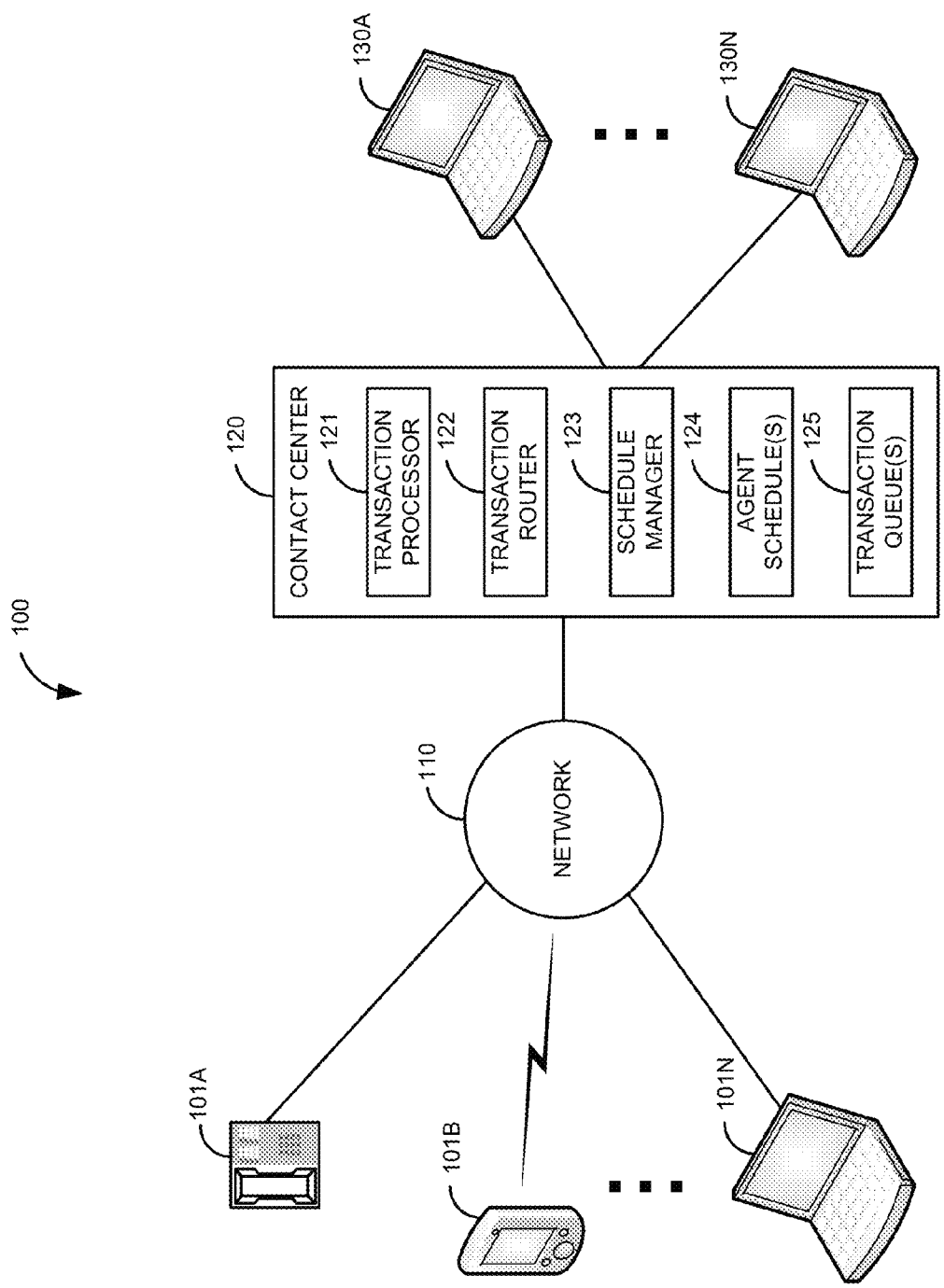
FIG. 1 is a block diagram of a first illustrative system for managing agent schedules in a contact center.

FIG. 1 is a block diagram of a first illustrative system 100 for managing agent schedules 124 in a contact center 120. The first illustrative system 100 comprises communication devices 101A-101N, a network 110, the contact center 120, and agent terminals 130A-130N.

The communication device 101 may be any device that can communicate on the network 110, such as a Personal Computer (PC), a telephone, a video system, a cellular telephone, a Personal Digital Assistant (PDA), a tablet device, a notebook device, and/or the like. As shown in FIG. 1, any number of communication devices 101A-101N may be connected to network 110, including only a single communication device 101. In addition, the communication device 101 may be directly connected to the contact center 120 without an intervening network 110.

The network 110 can be any collection of communication devices that can send and receive information, such as the Internet, a Wide Area Network (WAN), a Local Area Network (LAN), the Public Switched Telephone Network (PSTN), a packet switched network, a circuit switched network, a cellular network, a Voice over Internet Protocol (VoIP) network, a combination of these, and the like. The network 110 can use a variety of protocols, such as Ethernet, Internet Protocol (IP), Session Initiation Protocol (SIP), Integrated Services Digital Network (ISDN), video protocols, email protocols, text protocols, and the like.

The contact center 120 can be or may include any hardware/software that can handle transactions, such as, a call center, a Private Branch Exchange (PBX), a switching system, a voice switch, a video switch, a router, a communication system, an email system, an Instant Messaging (IM) system, a text messaging system, a video system, a virtual reality system, an Interactive Voice Response (IVR) system, a web application, and/or the like. The contact center 120 can handle different kinds of transactions, such as voice transactions, video transactions, email transactions, Instant Messaging (IM) transactions, text transactions, chat transactions, and/or the like. A transaction is with a person that generates the voice transaction, the video transaction, the email transaction the IM transaction, and/or the text transaction. The contact center 120 can be any system that can handle transactions/agents. An agent can be a human agent. However, in other embodiments, the agent can also comprise an automated agent or any kind of resource that can handle a transaction.

The contact center 120 further comprises a transaction processor 121, a transaction router 122, a schedule manager 123, agent schedule(s) 124, and a transaction queue(s) 125. Although the contact center 120 is shown comprising elements 121-125, in some embodiments, different elements 121-125 can be distributed across multiple contact centers 120 and/or multiple devices, including devices in the network 110. Likewise, some or portions of elements 121-125 may be included in the communication devices 101A-101N. In other embodiments, the contact center 120 may not include all of the elements 121-125. For example, the contact center 120 may not include the transaction queue(s) 125.

The transaction processor 121 can be or may include any hardware/software that can process transactions, such as a voice call processor, a video call processor, a text message processor, an IM processor, an email processor, and/or the like. The transaction processor 121 can handle all the same types of transactions and/or different types of transactions. For example, in one embodiment, the transaction processor 121 can handle voice and email transactions.

The transaction router 122 can be or may include any hardware/software that can route a transaction, such as a router, a such as a voice call processor, a video call processor, a text message processor, an Instant Messaging processor, an email processor, and/or the like.

The schedule manager 123 can be or may include any hardware/software that can manage agent schedules 124 in the contact center 120. The schedule manager 123 can manage schedules for different agents associated with different or the same transaction queues 125.

The transaction queue(s) 125 can be or may include any hardware/software that can hold or manage transactions. The transaction queue(s) 125 may be used to handle inbound transactions and/or outbound transactions. For example, the transaction queue(s) 125 may be used to handle transactions based on a First-In-First-Out (FIFO) method. The transactions queue(s) 125 may comprise separate transaction queue (s) 125 for different types of transactions. For instance, one transaction queue 125 may be used for voice transactions and another transaction queue 125 may be used for Instant Messaging (IM) transactions. In one embodiment, the transaction queue 125 may be used for both inbound and outbound transactions. In some embodiments, the transaction queues 125 may contain scheduled callbacks. In some embodiments, the contact center 120 may be a queue-less contact center 120 where the transactions are in a pool or automatically routed to an agent.

The agent terminals 130A-130N can be or may include any device that can be used by an agent to handle transactions, such as the communication device 101, a terminal, and/or the like. In FIG. 1, the agent terminals 130A-130N are shown directly connected to the contact center 120. However, in other embodiments, the agent terminals 130A-130N may be connected to the contact center 120 via the network 110 or another network (e.g., remote agent terminals). Thus, the agent terminals 130A-130N can be local and/or remote to the contact center 120.

The transaction processor 121 receives a transaction. The transaction processor 121 can receive a transaction in various ways, such as by receiving an inbound call from the transaction queue 125, receiving an inbound video call from the transaction queue 124, receiving an email, receiving a text message, receiving a request to establish an Instant Message session, receiving a request for a callback, receiving a connection to an outbound call, and/or the like. In one embodiment, all the transactions are real-time transactions, such as voice, video, and Instant Messaging transactions.

The transaction router 122 determines the best agent to handle the transaction in the contact center 120. The transaction router 122 can determine the best agent to handle the transaction in various ways, such as based on a prior transaction with a customer, based on a Service Level Agreement, based on an expertise of an agent, based on a skill set of the agent, based on a language spoken by the agent, based on a caller ID, based on input to an Interactive Voice Response (IVR) system, based on a product, based the number of transactions in the transaction queue(s) 125, based on a relationship with a customer or company, and/or the like.

The transaction router 122 determines a time for the best agent to handle the transaction. The time for the best agent to handle the transaction can be based on a variety of factors, such as based on a defined call back time, based on a projected wait time, based on a queue position in the transaction queue 125, based words spoken by a customer while the customer is waiting for the transaction to be handled, based on a gesture made by the customer while the customer is waiting for the transaction to be handled, based on language being used by the contact (e.g., profanity), based on goals of a business, customer or agent, and/or the like.

The time for the best agent to handle the transaction can be dynamic in that it can change as factors change in the contact center 120. For example, the time for the best agent to handle the contact may be moved up or back based on a gesture or profanity (or lack of profanity) used by the customer. Alternatively, the time to handle the transaction can dynamically change based on any detectable attribute in the contact center, such as contact center load, contact center staffing, weather conditions, or any other condition.

In response to determining the time for the best agent to handle the transaction, the schedule manager 123 searches a schedule 124 of the best agent. The schedule of the best agent 124 contains a movable event. A movable event is an event that can be rescheduled. For example, a movable event can be a break period, a lunch period, an appointment that can be rescheduled, and/or the like. The schedule of the best agent may also contain fixed events. A fixed event cannot be rescheduled. A fixed event can be for a training session, for a meeting, for a vacation, for a defined call back with a customer, and/or the like.

The schedule manager 123 determines that the time for the best agent to handle to transaction is during or close to the movable event. For example, the schedule manager 123 determines that a customer wants to schedule a callback at a time that is just before the best agent is scheduled for a one hour lunch break. In response to determining that the time for the best agent to handle the transaction is during or close to the movable event (e.g., the lunch break) the schedule manager 123 reschedules the movable event in the schedule of the best agent to allow the best agent to handle the transaction. The transaction router 122 routes the transaction to the agent for handling (e.g., at agent terminal 130N).

In one embodiment, when the movable event is rescheduled, the rescheduling causes the rescheduled movable event to become a fixed event that can no longer be rescheduled. This way the agent's movable event (e.g., a break period) cannot be continually moved. Alternatively, the movable event may become a fixed event based on a defined number of times that the movable event is rescheduled. In another embodiment, the movable event may be constrained to a fixed window. For example the movable event may only be moved if it is moved within the first 10 minutes of a movable event that is a half hour long.

Figure 2:
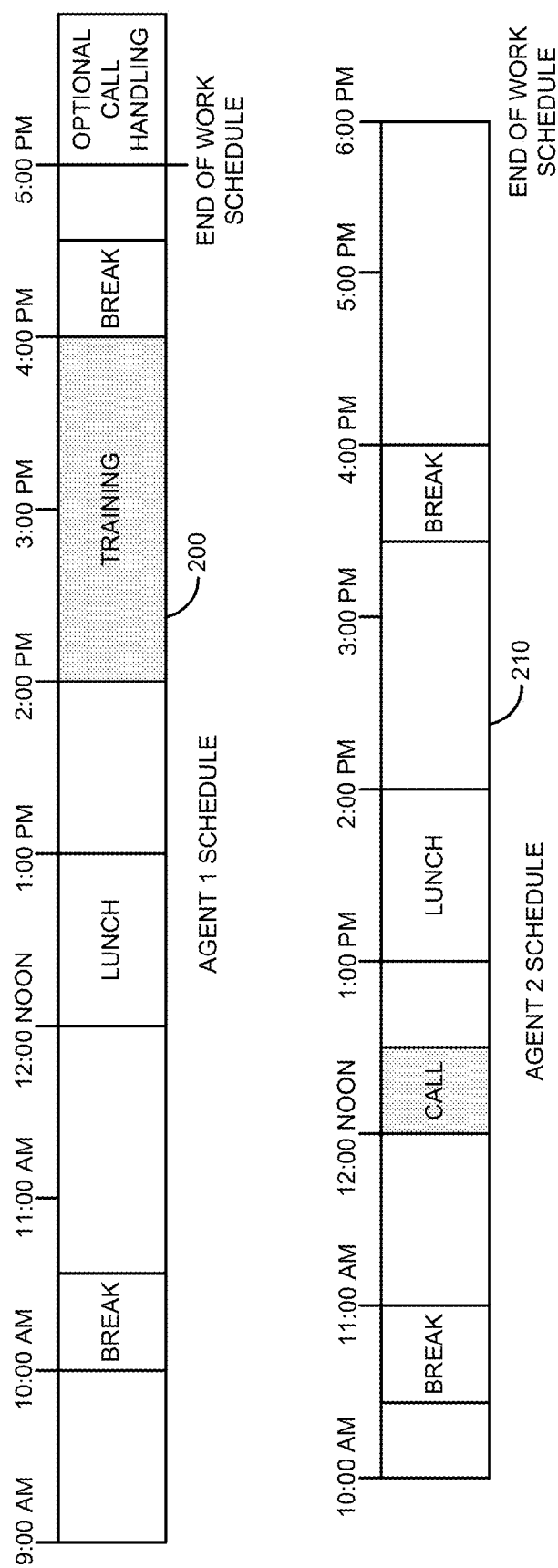
FIG. 2 is a diagram of agent schedules containing fixed events and movable events.

FIG. 2 is a diagram of agent schedules (200 and 210) containing fixed events and movable events. The fixed events in FIG. 2 are shown in grey. FIG. 2 contains a schedule of agent 1 (200) and agent 2 (210). The schedule of agent 1 (200) contains movable event break periods from 10:00 AM to 10:30 AM and from 4:00 PM to 4:30 PM. The schedule of agent 1 (200) also contains a movable event that is a lunch break from 12:00 noon to 1:00 PM. The schedule of agent 1 also contains a movable event that is an optional call handling period from 5:00 PM to 6:00 PM. The schedule of the agent 1 (200) also contains a fixed event that is a training session from 2:00 PM to 4:00 PM.

The schedule of the agent 2 (210) contains three movable events: a break from 10:30 AM to 11:00 AM, a lunch break from 1:00 PM to 2:00 PM, and a break from 3:30 PM to 4:00 PM. The schedule of the agent 2 (210) also has a fixed event (a customer call back) from 12:00 noon to 12:30 PM.

To illustrate how the above process works, consider the following illustrative examples. The transaction processor 121 receives an incoming voice call (a transaction) from a customer at 9:58 AM via the transaction queue 125. The transaction router 122 determines that the best agent to handle the transaction is agent 1. This is because agent 1 has experience in the problem indicated by the customer and has worked with the customer previously. The transaction router 122 determines that the best time for agent 1 to handle the incoming call is to handle the call now (or as soon as agent 1 completes the current call). The schedule manager 123 searches the schedule 200 of agent 1. The schedule manager 123 determines that the time 9:58 AM is close to the movable event (the break from 10:00 AM to 10:30 AM in agent 1's schedule 200). The schedule manager 123 reschedules the movable event (the break from 10:00 AM to 10:30 AM) to start at 10:30 AM. The schedule manager causes the rescheduled movable event to become a fixed event. The schedule manager 123 notifies agent 1 that her break has been rescheduled to start at 10:30 AM so she can handle the incoming voice call from the customer. The transaction router 122 routes the call to agent 1 at agent terminal 130A so that agent 1 can handle the incoming call.

A customer, from a web site of the contact center 120, schedules a video callback with the contact center 120 in regard to product X. The transaction processor 121 receives the scheduled video callback. The scheduled video callback is for 1:30 PM. The transaction router 122 determines that the best agent to handle the transaction at 1:30 PM is agent 2 because agent 2 is an expert in product X. The schedule manager 123 searches the schedule of agent 2 (210) and determines that the scheduled video callback is during agent 2's lunch break. The schedule manager 123 reschedules agent 2's lunch break by moving agent 2's lunch break up to start at 12:30 and end at 1:30 PM (at the time of the scheduled video callback). Agent 1 is notified that his lunch break has been moved up so that he can take the video callback at 1:30 PM.

A customer that has a premium support agreement sends, via communication device 101A, an urgent email request to handle a product failure to the contact center 120. The transaction processor 121 receives the urgent email. The urgent email is received at 12:30 PM. The transaction router 122 determines that agent 1 is the best agent to handle the urgent email because agent 1 has been assigned to handle the premium support agreement for this customer. The transaction router 122 determines that the email must be handled immediately by agent 1 according to the premium support agreement. The schedule manager 123 searches the schedule of agent 1 (200) and determines that the 12:30 PM email is in the middle of agent 1's lunch break. The schedule manager 123 notifies agent 1 of the urgent email and that agent 1 must handle the email immediately. The schedule manager 123 splits the movable event (agent 1's lunch break from noon to 1:00 PM). The schedule manager reschedules a portion (½) of agent 1's lunch break to start at 1:00 PM and end at 1:30 PM. Agent 1 is notified of the rescheduled portion of her lunch break. Agent 1 handles the email immediately.

Alternatively, agent 1 can be compensated by giving agent 1 a longer break period by rescheduling the portion of the lunch break to start at 1:00 PM and end at 1:45 PM. In this example, agent 1 actually gets an extra 15 minutes for her lunch break because she handled the urgent email. In other embodiments, agent 1 may be compensated in other ways, such as monetarily.

A customer via an Interactive Voice Response (IVR) indicates that he wants a scheduled callback at 5:30 PM. The transaction processor 121 receives the scheduled callback. The transaction router 122 determines that agent 1 is the best agent to handle the callback. The schedule manager 123 searches the schedule of agent 1 (200) and determines that the time for agent 1 handle the call back is during an optional movable event that is after a time that the agent is scheduled to work. The schedule manager 123 notifies agent 1 that she is to stay and handle the scheduled callback at 5:30. Agent 1 handles the callback at 5:30.

Figure 3:
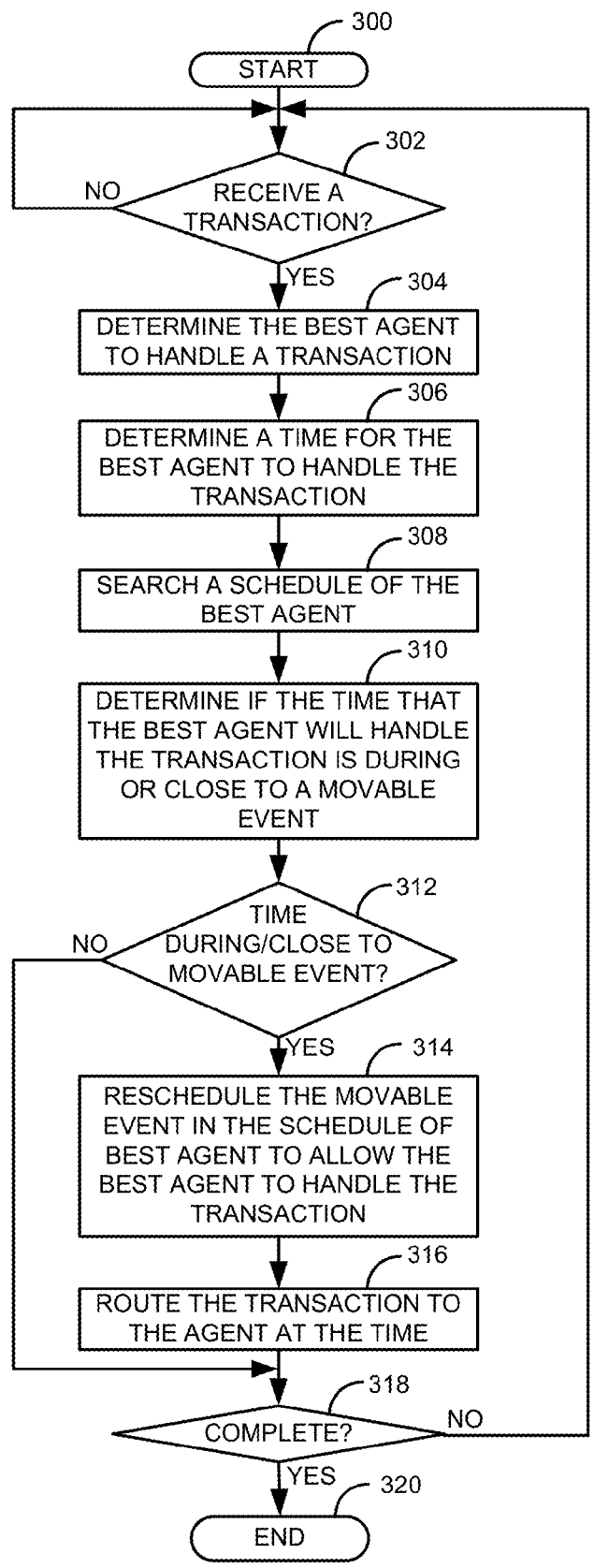
FIG. 3 is a flow diagram of a process for managing agent schedules in a contact center.
Figure 4:
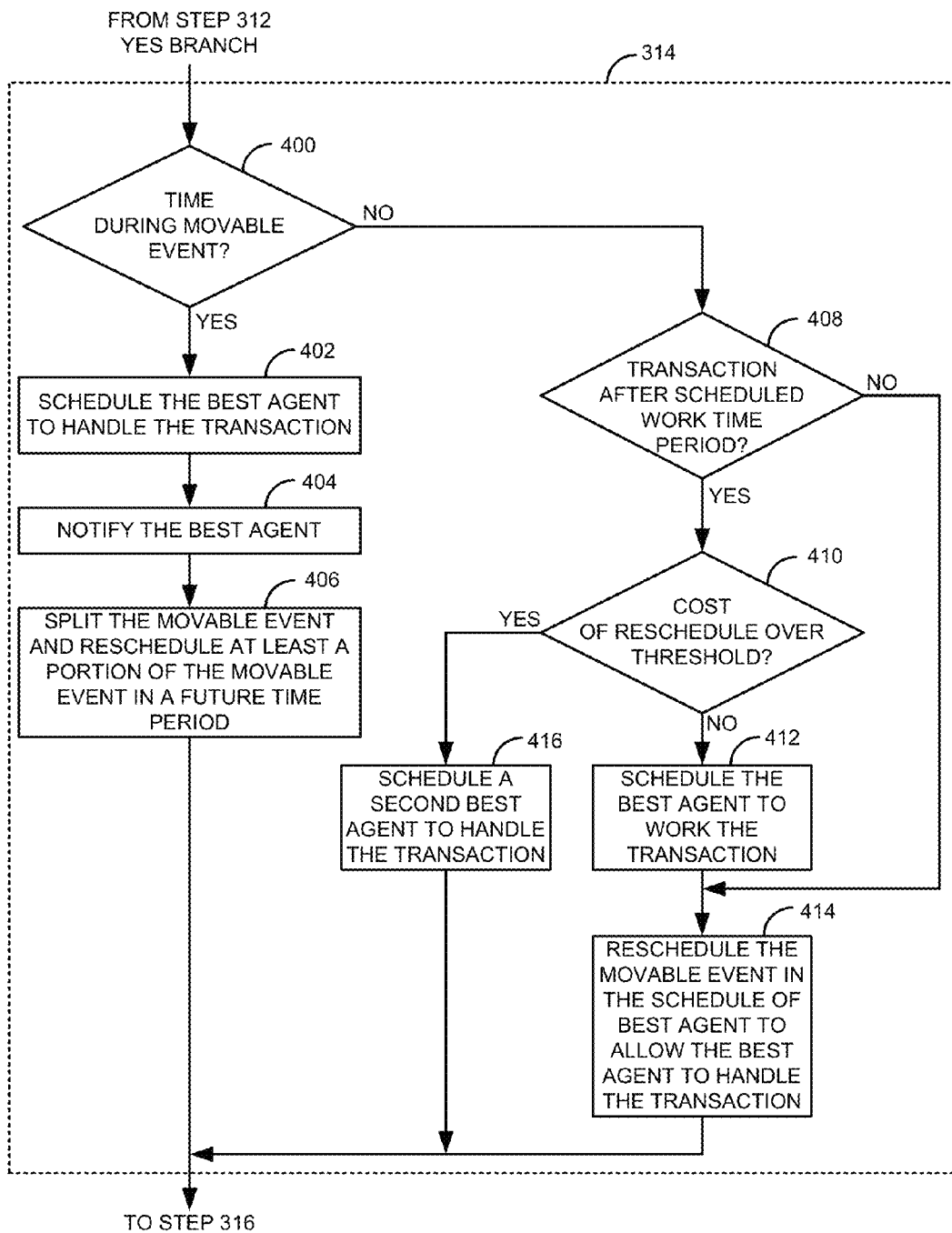
FIG. 4 is a flow diagram of a process for rescheduling movable events in a contact center.
Figure 5:
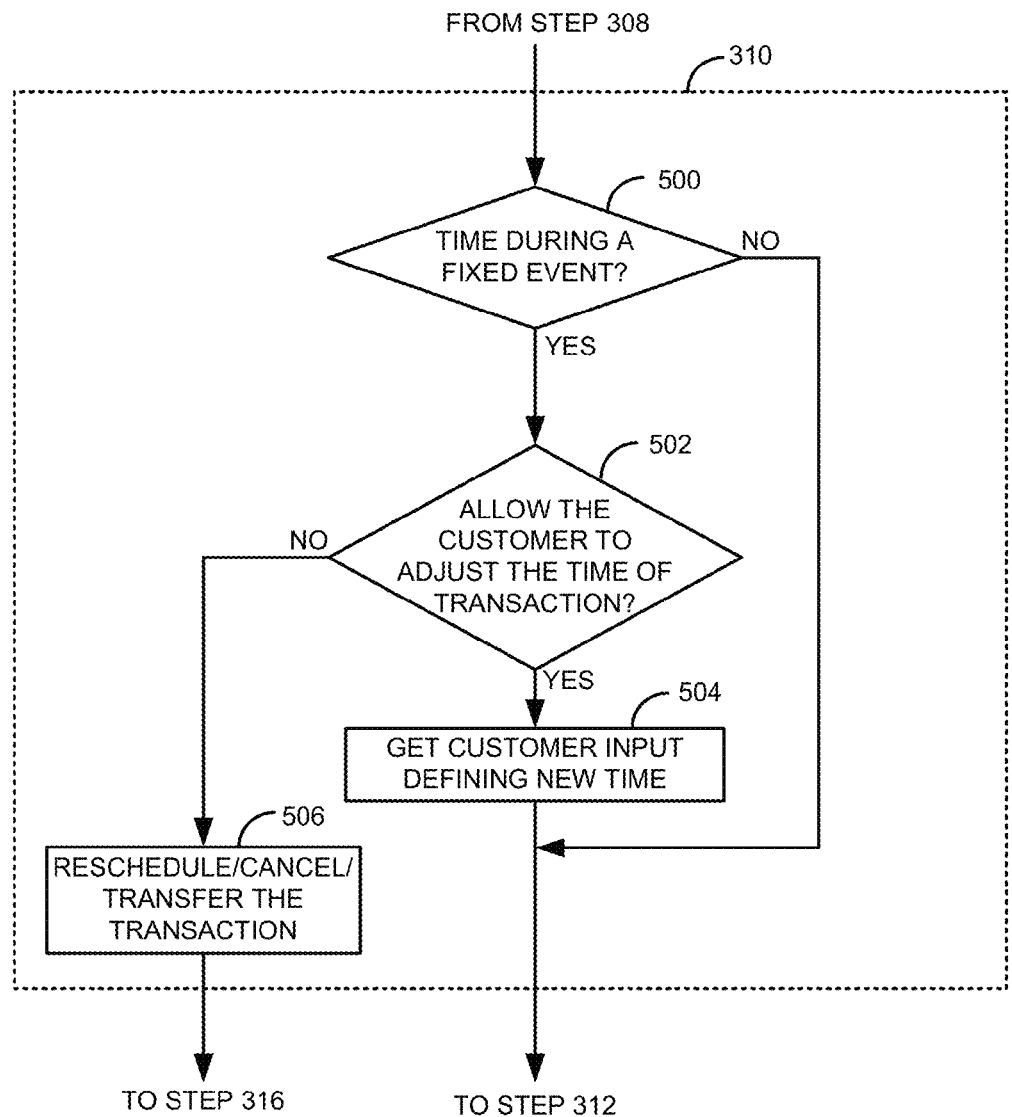
FIG. 5 is a flow diagram of a process for managing fixed and movable events in a contact center.

FIG. 3 is a flow diagram of a process for managing agent schedules 124 in a contact center 120. Illustratively, the communication devices 101A-101N, the contact center 120, the transaction processor 121, the transaction router 122, the schedule manager 123, the agent schedules 124, the transaction queue(s) 125, and the agent terminals 130A-130N are stored-program-controlled entities, such as a computer or processor, which performs the method of FIGS. 3-5 and the processes described herein by executing program instructions stored in a tangible computer readable storage medium, such as a memory or disk. Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

The process starts in step 300. The process determines in step 302 if a transaction has been received. If a transaction has not been received in step 302, the process repeats step 302. If a transaction has been received in step 302, the process determines in step 304 the best agent to handle the transaction. The process determines in step 306 a time for the best agent to handle the transaction. The process searches in step 308 a schedule of the best agent. The process determines in step 310 if the time that the best agent will handle the transaction is during and/or close to the movable event.

The process can determine that a transaction is close to a movable event based on various factors. A transaction can be determined to be close to a movable event based on an average time to handle an existing call or based on a time to handle the incoming call (the transaction). For example, if a projected time of handling the transaction would overlap the movable event (even though the transaction starts before the movable event), the process can determine that the transaction is close to the movable event. Alternatively, determining that the transaction is close to the movable event can be based on an administered amount of time before the movable event.

If the transaction is not during or close to the movable event in step 312, the process goes to step 318. If the transaction is during or close to the movable event in step 312, the process reschedules in step 314 the movable event in the schedule of the best agent to allow the best agent to handle the transaction. The process routes the transaction to the agent at the determined time in step 316. The process goes to step 318.

In another embodiment, even if the transaction is during a movable event, rescheduling the movable event in step 314 may be overridden by other factors. For example, if the contact center's dynamically projected transaction load (e.g., the number of incoming calls) is projected to be low, rescheduling the movable event may not occur because there are enough other agents to handle the transaction. Alternatively, if the dynamically projected transaction load is projected to be high, then movable events can be rescheduled in step 314.

In another embodiment, the agent may be given the option of whether or not to handle the transaction. If the agent accepts to handle the transaction, the process will reschedule the movable event in step 314. Otherwise, if the agent does not accept to handle the transaction, the process will not reschedule the movable transaction and another agent will handle the transaction.

The process determines if it is complete in step 318. The process can be complete based on various factors, such as the agent logging out at the end of a shift, based on contact center load, based on the agent indicating that he/she does not want to allow movable events any more, and/or the like. If the process is not complete in step 318, the process goes to step 302. Otherwise, if the process is complete in step 318, the process ends in step 320.

FIG. 4 is a flow diagram of a process for rescheduling movable events in a contact center. The process of FIG. 4 is an exemplary embodiment of step 314 in FIG. 3. After the process determines that the time is during or close to a movable event in step 312, the process determines in step 400 if the time for the best agent to handle the transaction is during the movable event. If the time for the best agent to handle the transaction is during the movable event in step 400, the process schedules, in step 402, the best agent to handle the transaction. The process notifies in step 404 the best agent to handle the transaction. The process splits in step 406 the movable event and reschedules at least a portion of the movable event in a future time period and goes to step 316. The process may reschedule a portion of the movable event or the entire movable event. For example, if 15 minutes of an hour break has already occurred, the process may reschedule the entire movable event (the entire 1 hour) at a future time. The rescheduled event may be rescheduled to another day or during another shift of the agent.

If the process determines in step 400 that the time is not during a movable event, the process determines if the transaction is after a scheduled work time period in step 408. If the process is not after a scheduled work time period (i.e., the time is close to the movable event) in step 408, the process goes to step 414. Otherwise, if the process determines in step 408 that the transaction is after the scheduled work time, the process determines in step 410 if the cost of rescheduling the agent is over a cost threshold. If the cost of rescheduling the agent is over a cost threshold in step 410, the process schedules, in step 416, a second best agent to handle the transaction. For example, if the cost of having the agent take an extra hour of overtime is worth having the agent handle the transaction is over a defined value, the process will schedule a second agent to handle the transaction. If a second agent is scheduled to handle the transaction in step 416, the same process of rescheduling a movable event of the second agent may also occur.

Otherwise, if the process determines in step 410 that the cost of rescheduling the agent is not over the threshold, the process schedules the agent to work the transaction in step 412. The process then reschedules the movable event in the schedule of the best agent to allow the best agent to handle the transaction in step 414. The process then goes to step 316.

The above process of using cost to rescheduling movable events can be used for any of the above processes. For example, the steps 402-406 can also include a cost before splitting a movable event. A cost can be used when a time is close to the movable event as well.

Likewise, a value of the transaction can also be a factor in rescheduling a movable event. For example, if the customer is not a high value customer (a customer who does a lot of business with the contact center), rescheduling a movable event may not occur. Alternatively, if the customer is a high value customer, rescheduling a movable event will occur. In another embodiment, the value of the transaction can be a monetary value. For instance, if the transaction is to purchase an expensive product, then rescheduling of the transaction will occur.

FIG. 5 is a flow diagram of a process for managing fixed and movable events in a contact center. FIG. 5 is a flow diagram of one embodiment of step 310 of FIG. 3. After searching a schedule of the best agent in step 308, the process determines in step 500 if the time for the best agent to handle the transaction is during a fixed event. If the time for the best agent to handle the transaction is not during the fixed event in step 500 the process goes to step 312. Otherwise, if the process determines in step 500 that the time for the best agent to handle the transaction is during a fixed event, the process determines in step 502 if it is allowed for the customer to adjust the time of the transaction. If the customer is not allowed adjust the time of the transaction in step 502, the process reschedules/cancels/transfers the transaction and the process goes to step 316. For example, the process could transfer the transaction to another agent or call center. Otherwise, if the customer is allowed to adjust the time of the transaction in step 502, the process gets input from the customer defining a new time. The process goes to step 312.

To illustrate, consider the following example based on the schedules of FIG. 2. After determining that agent 1 is the best agent to handle an incoming call at 3:00 PM, the process determines in step 500 that the time (3:00 PM) is during a fixed event (training for agent 1 from 2:00 PM to 4:00 PM). The process determines in step 502 that the customer is allowed to adjust the time of the transaction, the process gets new input from the customer in step 504 defining a new time for a callback at 4:00 PM. The process determines in step 312 that the new time for the callback (4:00 PM) is during a movable event (the break for agent 1 at 4:00 PM). The process reschedules, in step 314, the movable event (the break of agent 1 at 4:00 PM) to start at 4:30 so agent 1 can handle the callback at 4:00 PM.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   receiving, from a communication device and by a microprocessor, a transaction in a contact center;
   in response to receiving the transaction:
      determining, by the microprocessor, a best agent to handle the received transaction; and
      determining, by the microprocessor, a time for the best agent to handle the received transaction;
   in response to determining the best agent to handle the received transaction and the time for the best agent to handle the received transaction, automatically searching, by the microprocessor, a schedule of the best agent, wherein the schedule of the best agent contains a movable event;
   determining, by the microprocessor, that the time for the best agent to handle the received transaction is during or close to the movable event;
   automatically rescheduling, by the microprocessor, the movable event in the schedule of the best agent to allow the best agent to handle the received transaction; and routing, by the microprocessor, the received transaction to an agent terminal of the best agent.

2. The method of claim 1, wherein automatically rescheduling the movable event comprises splitting, by the microprocessor, the movable event and rescheduling, by the microprocessor, at least a portion of the movable event in a future time period.

3. The method of claim 2, wherein the movable event is a break period and further comprising compensating the best agent for handling the transaction by giving the best agent a longer total break period.

4. The method of claim 1, wherein the movable event is a time period after the best agent is scheduled to work, wherein the transaction is a scheduled callback to a customer at a time during the time period after the best agent is scheduled to work and wherein automatically rescheduling the movable event is to schedule the best agent to work a portion of the time period during the movable event.

5. The method of claim 1, wherein automatically rescheduling the movable event is based on a dynamically projected transaction load in the contact center.

6. The method of claim 1, wherein the best agent is provided an option of whether or not to handle the transaction.

7. The method of claim 1, wherein the schedule of the best agent further comprises a fixed event and wherein a customer is given an option to adjust a time of the transaction based on the fixed event and the movable event.

8. The method of claim 1, wherein automatically rescheduling the movable event is based on a value of the transaction.

9. The method of claim 1, wherein automatically rescheduling the movable event is based on a cost to the contact center.

10. The method of claim 9, wherein the cost to the contact center is over a cost threshold and wherein automatically rescheduling the movable event is rescheduling the movable event of a second best agent.

11. The method of claim 1, wherein automatically rescheduling the movable event causes the rescheduled movable event to become a fixed event.

12. A system comprising:
a microprocessor; and
a computer readable medium, coupled with the microprocessor and comprising microprocessor readable and executable instructions that programs the microprocessor to execute:
a transaction processor that receives a transaction from a communication device;
a transaction router that determines a best agent to handle the transaction in a contact center and determines a time for the best agent to handle the transaction in response to receiving the transaction, and routes the received transaction to an agent terminal of the best agent; and
a schedule manager that automatically searches a schedule of the best agent in response to determining the best agent to handle the received transaction and the time for the best agent to handle the received transaction, wherein the schedule of the best agent contains a movable event, determines that the time for the best agent to handle the transaction is during or close to the movable event, and automatically reschedules the movable event in the schedule of the best agent to allow the best agent to handle the transaction.

13. The system of claim 12, wherein automatically rescheduling the movable event comprises splitting the movable event and rescheduling at least a portion of the movable event in a future time period.

14. The system of claim 13, wherein the movable event is a break period and wherein the schedule manager further compensates the best agent for handling the transaction by giving the best agent a longer total break period.

15. The system of claim 12, wherein the movable event is a time period after the best agent is scheduled to work, wherein the transaction is a scheduled callback to a customer at a time during the time period after the best agent is scheduled to work and wherein automatically rescheduling the movable event is to schedule the best agent to work a portion of the time period during the movable event.

16. The system of claim 12, wherein automatically rescheduling the movable event is based on a dynamically projected transaction load in the contact center.

17. The system of claim 12, wherein the schedule of the best agent further comprises a fixed event and wherein a customer is given an option to adjust a time of the transaction based on the fixed event and the movable event.

18. The system of claim 12, wherein automatically rescheduling the movable event is based on a cost to the contact center.

19. The system of claim 18, wherein the cost to the contact center is over a cost threshold and wherein automatically rescheduling the movable event is rescheduling the movable event of a second best agent.

20. The method of claim 1, wherein the time for the best agent to handle the received transaction is moved up or back based on a gesture or profanity detected in the transaction.

* * * * *